(12) United States Patent
Miyawaki

(10) Patent No.: US 9,013,776 B2
(45) Date of Patent: Apr. 21, 2015

(54) LIGHT MODULATOR

(71) Applicant: Canon Kabushiki Kaisha, Tokyo (JP)

(72) Inventor: Mamoru Miyawaki, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/046,676

(22) Filed: Oct. 4, 2013

(65) Prior Publication Data

US 2014/0098409 A1 Apr. 10, 2014

Related U.S. Application Data

(60) Provisional application No. 61/709,890, filed on Oct. 4, 2012, provisional application No. 61/751,785, filed on Jan. 11, 2013.

(51) Int. Cl.
*G02F 1/03* (2006.01)
*G02F 1/01* (2006.01)

(52) U.S. Cl.
CPC ............ *G02F 1/0102* (2013.01); *G02F 1/0121* (2013.01); *G02F 2203/055* (2013.01); *G02F 2203/10* (2013.01)

(58) Field of Classification Search
USPC .................. 359/237, 238, 245, 246, 265–275
See application file for complete search history.

(56) References Cited

U.S. PATENT DOCUMENTS 6,118,586 A * 9/2000 Tanabe et al. ................. 359/566

FOREIGN PATENT DOCUMENTS

WO 2012173071 A1 12/2012

* cited by examiner

*Primary Examiner* — Tuyen Tra
(74) *Attorney, Agent, or Firm* — Canon U.S.A., Inc. IP Division

(57) ABSTRACT

A light modulator includes a band-pass filter configured to select a wavelength of an incident light; a first layer; a second layer configured to include a trench with a bottom surface, a side surface, and a top surface; a thin metal film provided on the side surface of the trench of the second layer; and a dielectric layer provided between the first and second layers at the bottom and the top surfaces of the trench. An electric field is applied to the dielectric layer by using the first and second layers. The dielectric layer is provided between the thin metal film and the first layer at the side surface of the second layer so that the thin metal film has an anisotropic permittivity due to the electric field.

11 Claims, 10 Drawing Sheets

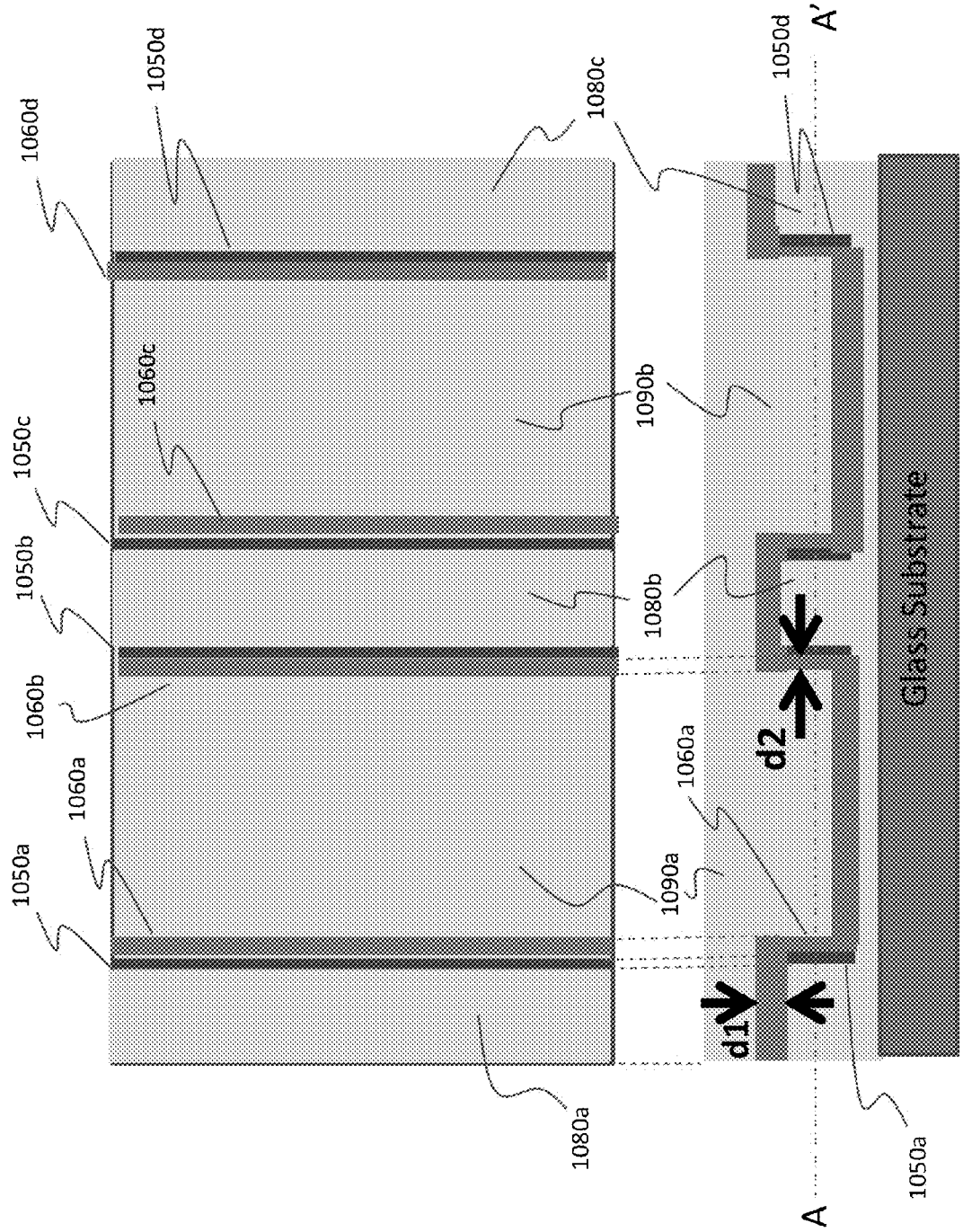

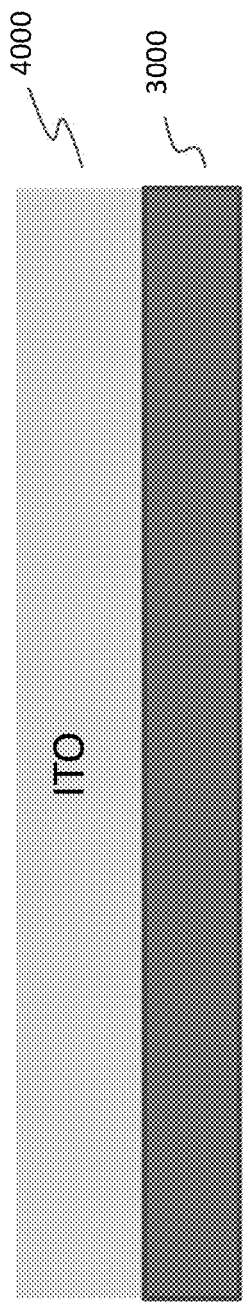
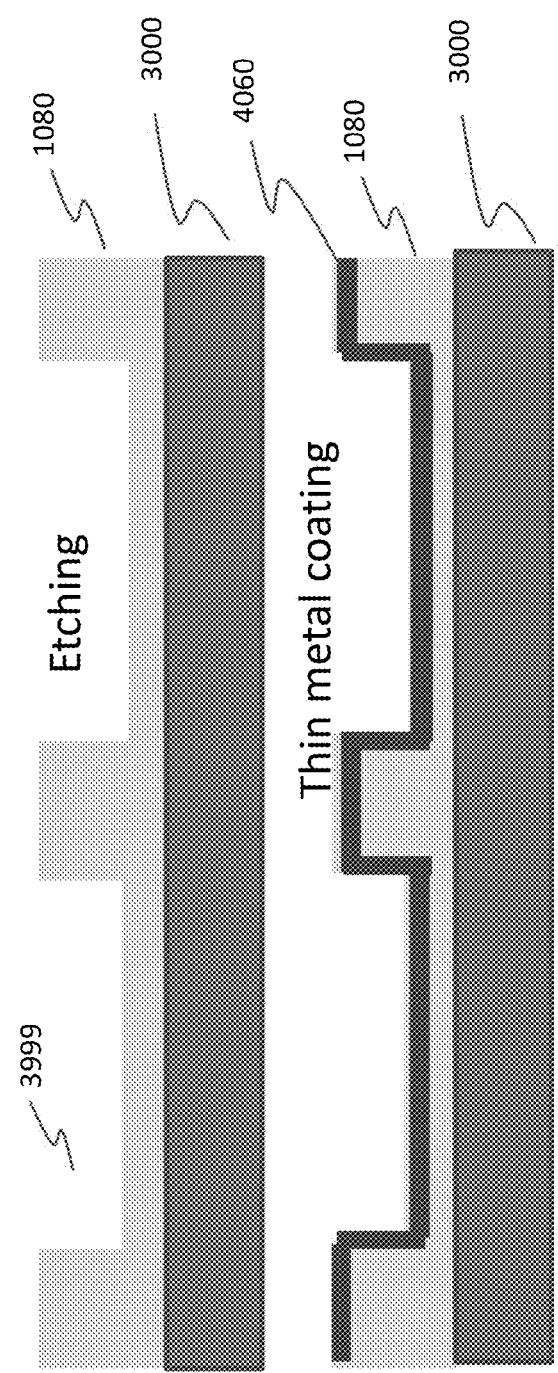
Fig. 4A
Fig. 4B
Fig. 4C
Fig. 4D

LIGHT MODULATOR

CROSS REFERENCE TO RELATED APPLICATIONS

This application claims priority to U.S. provisional application No. 61/709,890 filed Oct. 4, 2012 entitled "LIGHT MODULATOR," the entire contents of which are hereby incorporated by reference.

This application claims priority to U.S. provisional application No. 61/751,785 filed Jan. 11, 2013 entitled "NEW PLASMONIC MATERIALS IN VISIBLE SPECTRUM THROUGH ELECTRICAL CHARGING," the entire contents of which are hereby incorporated by reference.

BACKGROUND

1. Field

An aspect of the present disclosure is related to a light modulator.

2. Description of the Related Art

As a spatial light modulator (SLM), an LCD-based spatial light modulator is generally used. The LCD-based spatial light modulator uses liquid crystal to shut off the light.

SUMMARY

A new light modulator that doesn't use a liquid crystal to modulate the light is disclosed. Exemplary embodiments provide a new light modulator by using an anisotropic permittivity.

According to an aspect of at least one exemplary embodiment, a light modulator includes a band-pass filter configured to select a wavelength of an incident light; a first layer; a second layer configured to include a trench with a bottom surface, a side surface, and a top surface; a thin metal film provided on the side surface of the trench of the second layer; and a dielectric layer provided between the first and second layers at the bottom and the top surfaces of the trench. An electric field is applied to the dielectric layer by using the first and second layers. The dielectric layer is provided between the thin metal film and the first layer at the side surface of the second layer so that the thin metal film has an anisotropic permittivity due to the electric field.

Further features will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are associated with FIGS. 2A and 2B.

FIGS. 4A, 4B, 4C, 4D, 4E, 4F, and 4G illustrate a method for providing the light modulator.

DESCRIPTION OF THE EMBODIMENTS

Embodiments will be described below with reference to the attached drawings.

An in-plane permittivity of a metal thin film can be different from an out-of-plane permittivity of the metal when the thickness of the metal is several nanometers (e.g., 5-7 nm). An anisotropic permittivity of the film can be seen due to the thickness. This phenomenon can be explained by what is referred to as a thin-film (or size) effect. This effect can occur depending on the thickness of the metal film. When the thickness of the metal film is about 50 nm, the anisotropic permittivity of the metal film cannot be seen, and the characteristic of the permittivity of the metal film becomes one of a bulk metal.

Both the in-plane permittivity and the out-of-plane permittivity can vary according to the thickness of the metal film, and especially the imaginary part, related to light absorption, of the out-of-plane permittivity increases sharply beyond comparison. In other words, a strong absorption of light can be seen due to the thickness of the metal film.

Even though the thickness of the metal film is not several nanometers and the characteristic of it looks like a bulk material, the anisotropic permittivity of the film can be seen when an electric field is locally applied to the surface of the metal film. It may be understood that the localized electric field can restrict the movement of the electron of the surface of the thin film.

An optical device may be provided that can selectively modulate a specified wavelength of light that includes a wide range of the wavelength.

Figure 1:
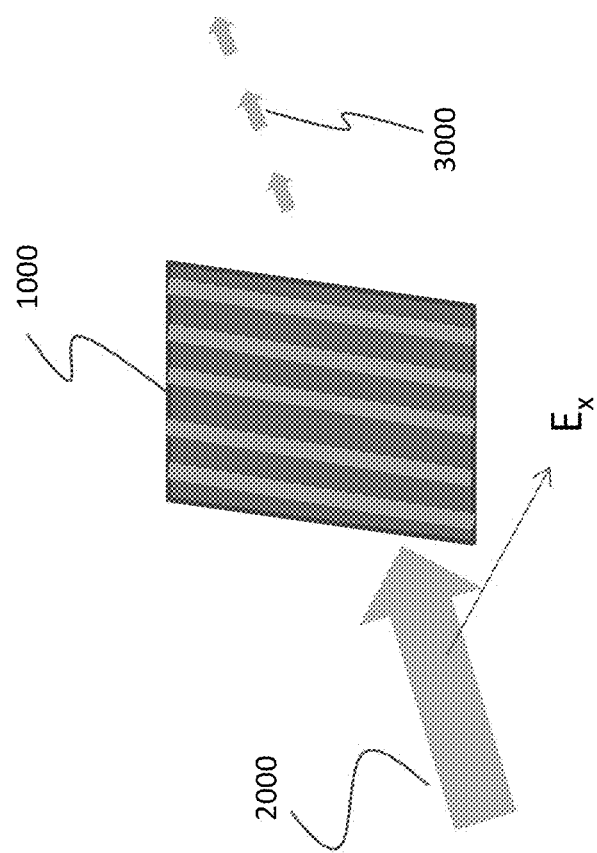
FIG. 1 illustrates a light modulator and a characteristic thereof.

FIG. 1 illustrates a light modulator 1000, and modulated light 3000 with a specified wavelength of an incident light 2000 that can pass through the light modulator 1000. The incident light 2000 is composed of a wide range of wavelength of light, and the light propagates in a z-direction. $E_x$ denotes an element of the incident light 2000 and the direction of $E_x$ is perpendicular to the z-direction. A polarizer (not shown) can obtain a polarized light. The light modulator 1000 can control the transparent wavelength of the incident light 2000 by using a voltage applied to the light modulator 1000.

Figure 2A:
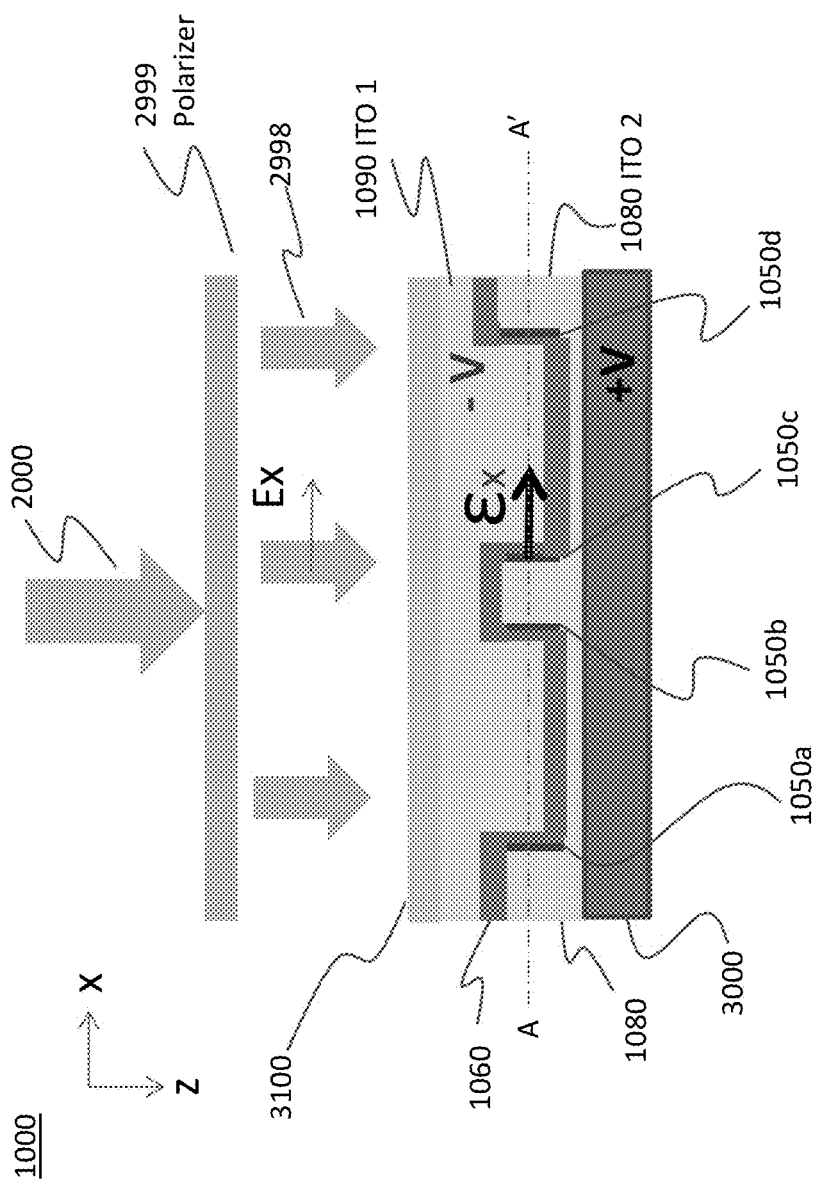
FIG. 2A illustrates a cross sectional view of a light modulator.

A cross sectional view of the light modulator 1000 is illustrated in FIG. 2A. The incident light is a polarized light 2998 composed of an element $E_x$ which can be obtained by a polarizer 2999. The light modulator 1000 includes a band pass filter 3100 for selecting the light having a specific wavelength, a first transparent layer 1090 (e.g., ITO (Indium Tin Oxide)), a dielectric layer 1060, a thin metal film 1050*a* (1050*b*, 1050*c*, 1050*d*), a second transparent layer 1080 (e.g., ITO), and a substrate 3000. A selected light with a wavelength can pass through the band pass filter 3100.

Since the polarized light 2998 impinges on the light modulator 1000, permittivity of the surface of the thin metal film 1050*a* (1050*b*, 1050*c*, 1050*d*) can be regarded as $\in_x$. An interval between the thin metal films 1050*a* and 1050*b* can be set to a length which is less than the wavelength of the incident light 2998. Therefore, when the light passing through near the thin metal film 1050, the light can be affected by the thin metal film 1050.

The bias voltage can be applied to the thin metal film 1050 by the first and second transparent layers (electrodes) 1080, and 1090. The thickness of the thin metal film 1050 can be set at 10 nm, for example.

During a no bias state, the light 2998 can go through the light modulator 1000 because the thin metal film 1050 with the 10 nm thickness may have a characteristic of a bulk, and the imaginary part of the permittivity $\in_x$ is small and the above described strong absorption doesn't occur.

On the other hand, when a negative voltage (e.g., −1 V) is applied to the first transparent layer (via a first electrode) 1090 and a positive voltage (e.g., 0 V) is applied to the second transparent layer (via a second electrode) 1080, the transparent amount of the light 2998 can be decreased. Because a side surface part of the dielectric layer 1060 adjacent to the first transparent layer (first electrode) 1090 becomes negative and the electron of the surface of the thin metal film 1050 can be driven away to the inside of the thin metal film 1050. In other words, an effective thickness of the thin metal film 1050 for the movement of the electron can be decreased. Therefore, the imaginary part of the permittivity $\in_x$, which is an element of permittivity in the x-direction, will be increased sharply and the anisotropic permittivity will occur. The light 2998 can be absorbed, and the amount of the transparent light decreases. Depending on the magnitude of the bias, the amount of the transparent light may become zero. By using an applied voltage, the intensity of light that passes through the light modulator 1000 can be controlled.

When a frequency of the light 2998 is close to a frequency of the surface plasmon excited on the surface of the thin film 1050, an absorption wavelength due to the surface plasmon may match with the frequency of the light 2998. When the absorption wavelength matches with the frequency of the light 2998, a zero transparent amount may be caused, and when the absorption wavelength doesn't match with the frequency of the light 2998, a non-zero transparent amount may be caused. Therefore, the S/N (Signal/Noise) ratio can be increased.

As illustrated in FIG. 2A, the light modulator has the first and second transparent layers (1080, 1090), and each transparent layer can be connected with an electrode to apply the voltage. The first transparent layer 1090 is contacted with the thin metal film which is adjacent to the second transparent layer 1080 through the dielectric layer 1060.

As illustrated in FIG. 2A, the polarizer 2999 can cause the polarized light 2998 which is polarized to an x-direction. A part of the incident light 2000 with the wide range of the wavelength can be removed by the band pass filter 3000 so that light with a specified wavelength can go through the light modulator 1000.

Figure 2B:
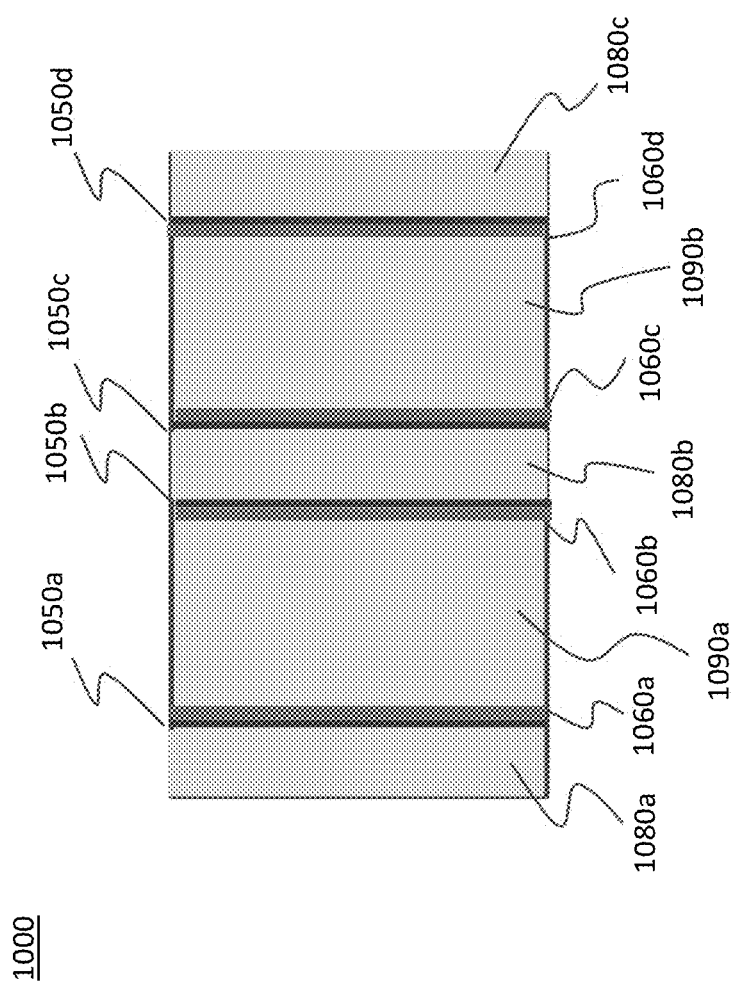
FIG. 2B illustrates a cross sectional view of the light modulator obtained by a cutting plane AA'.

A cross sectional view of the light modulator 1000 obtained by a cutting plane AA' is illustrated in FIG. 2B. Material of the thin film 1050a (1050b, 1050c, 1050d) may be Au (gold), Ag (silver), or an alloy.

A thickness of the first (second) transparent layer 1090 (1080) may be selected from a range between 0.01 μm and 1 μm. The thickness of the thin film 1050 in an x-direction is about 10 nm. A cross sectional view of the light modulator 1000 obtained by a cutting plane AA' of FIG. 3B is illustrated in FIG. 3A. The thickness d2 of the dielectric layer 1060 in FIG. 3B may be selected from a range between 5 nm and 50 nm. The thickness d1 of the dielectric layer 1060 in FIG. 3B may be selected from a range between 100 nm and 5000 nm. When there is a great difference between d1 and d2, an electric field may be locally applied to a thinner portion of the dielectric layer 1060. For example, when the thickness d1 is about 10 times or more than the thickness d2, the applied electric field can be localized to the dielectric layer with the thickness d2. The dielectric layer 1060 may be $SiO_2$, or SiN. The interval between the thin metal films 1050a and 1050b can be selected, for example, from a range between 80 and 100 nm so that the light can interact with the thin metal film 1050.

Figure 4E:
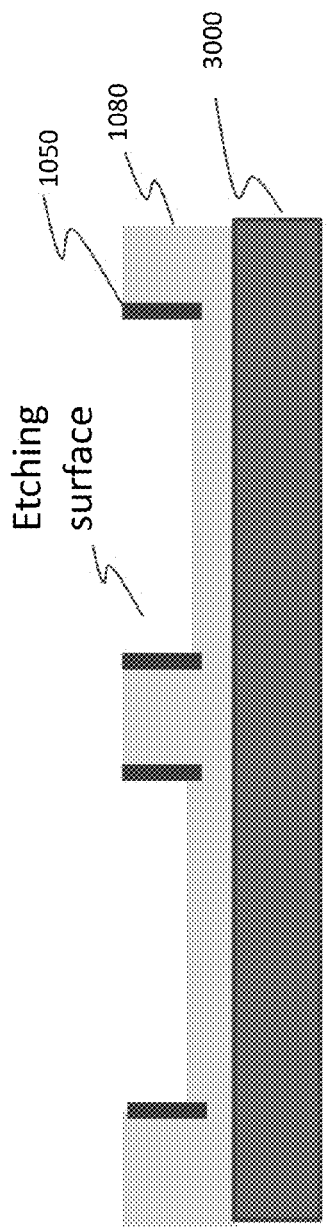

A method for providing the light modulator 1000 is illustrated by FIGS. 4A through 4G. For example, a glass substrate 3000 is prepared as illustrated in FIG. 4A. The ITO layer 4000 as the second transparent layer is formed on the glass substrate 3000 by spattering as illustrated in FIG. 4B. To form a trench on the ITO layer 4000, a reactive ion etching (RIE) can be executed as illustrated in FIG. 4C. The formed ITO layer 1080 with a trench structure 3999 is obtained. By a CVD (Chemical Vapor Deposition) method or a plasma-assisted spattering method, a thin Au film 4060 can be formed on the ITO layer 1080 as illustrated in FIG. 4D.

By using the CVD method, a surface of the Au film 4060 will be covered by a protective layer of $SiO_2$ or resist. And then, the protective layer and Au layer of the top surface of the ITO layer 1080 will be removed by an anisotropic etching mode of the RIE. After the removal of them, the remained protective layer can be removed as illustrated in FIG. 4E.

Figure 4F:
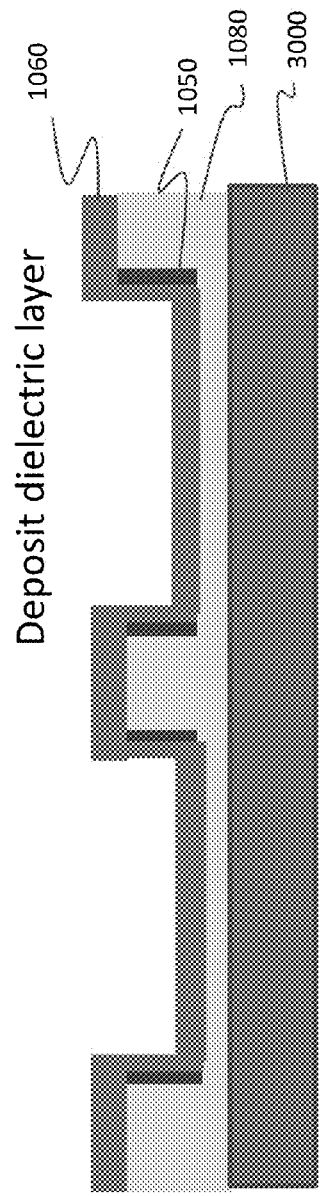
Figure 4G:
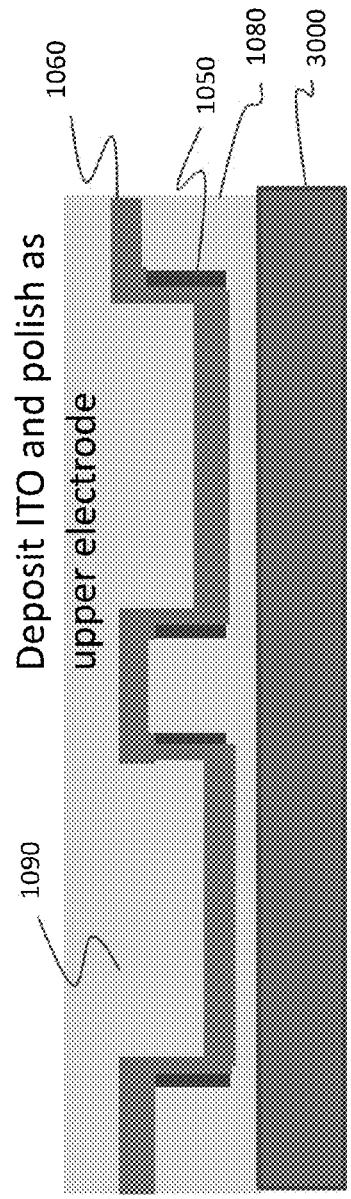

As illustrated in FIG. 4F, a dielectric layer 1060 of SiO2 or SiN can be formed, and then, as shown in FIG. 4G, another ITO layer 1090 as the first transparent layer can be formed thereon by spattering. As necessary, after the spattering, the surface of the top layer can be polished to be leveled by CMP (chemical mechanical polishing). Each ITO layer can be connected to an electrode to apply a voltage.

When each pixel includes one or more metal films (e.g., 1050a) to form a spatial light modulator, each pixel may have a high capacitance element due to the metal film.

Figure 5:
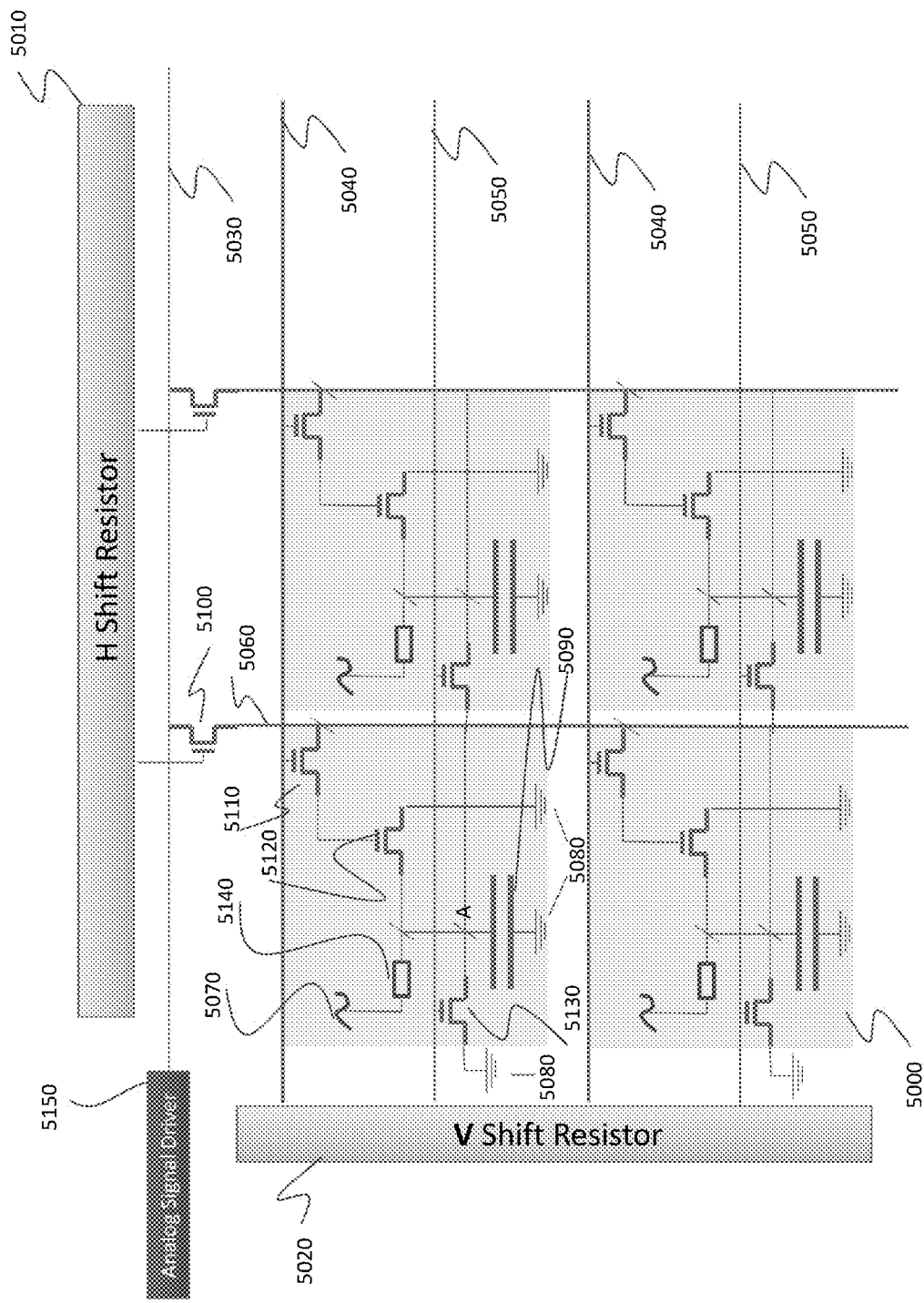
FIG. 5 illustrates a driving circuit.

A driving method for treating such high capacitance element is described below. As a first embodiment of the driving method, an equivalent circuit for analog input system is illustrated in FIG. 5.

Each pixel 5000 is defined by a horizontal shift resistor (H Shift Resistor) 5010 and a vertical shift resistor (V Shift Resistor) 5020.

The high capacitance element 5090 is placed in each pixel 5000.

The horizontal shift resistor 5010 can select a column to write an analog signal. The vertical shift resistor 5020 can select a row to write the signal. The analog signal is sent by an analog signal driver 5150 through an analog signal line 5030.

A horizontal gate line 5040 is connected to a gate of a transistor 5110 for each pixel 5000. A horizontal gate line 5050 is connected to a gate of a reset transistor 5130 for each pixel 5000. The source of the transistor 5130 is grounded by an earth 5080.

A vertical line 5060 connected to the drain of the transistor 5100 is also connected to the transistor 5110 as illustrated in FIG. 5.

A transistor 5120, which is a FET (Field-Effect Transistor), is used for source follower amplifier. A resistance 5140 is used as the load for the source follower amplifier. A voltage source 5070 is connected to the resistance 5140. A transistor 5130 to reset the voltage of the high capacitance element 5090 is used. The drain of transistor 5130 and a source of the transistor 5120 are reset to a ground level by using the earth 5080.

A driving method for treating the high capacitance method is described below.

Step 1: Reset Operation

Figure 6:
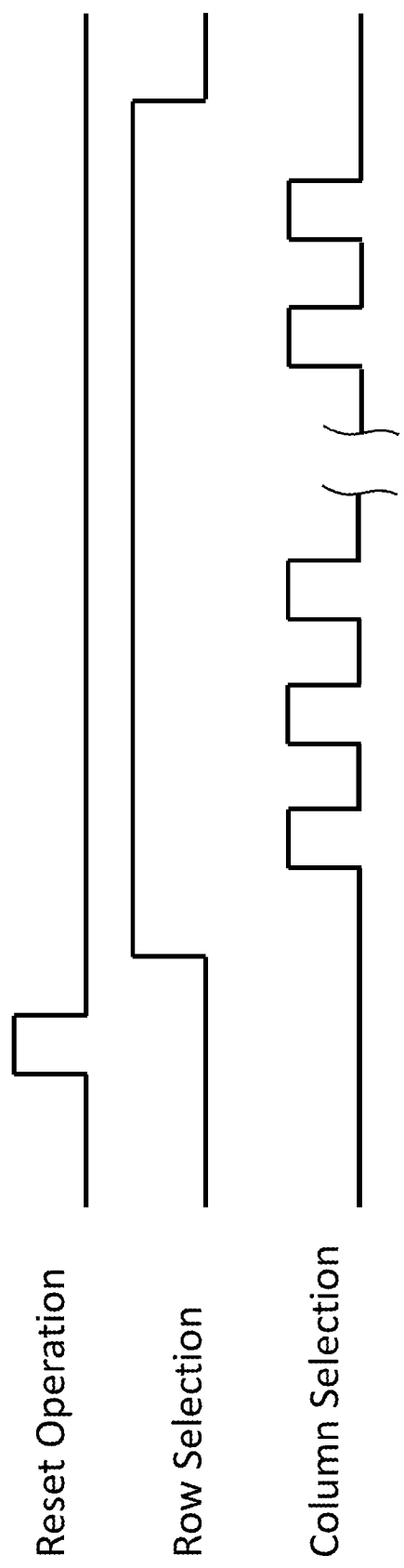
FIG. 6 illustrates a timing chart.

Before writing the signal to each capacitance 5090 per pixel, the voltage of the capacitance 5090 in a row selected by the vertical shift resistor 5020 will be reset by the reset operation as illustrated in FIG. 6. The reset operation can be executed for each row, or executed by all or a plurality of the rows at the same time. When the line 5050 is high due to the vertical shift resistor 5020, the transistor 5130 as a reset transistor is ON, and the voltage of a portion denoted as A in FIG. 5 becomes 0 (V).

Step 2: Writing Operation

After the line 5050 becomes low by the vertical shift resistor 5020, the line 5040 becomes ON by the vertical shift resistor 5020. A row for the writing is selected as illustrated in a timing chart of FIG. 6. Then, the column will be selected by the horizontal shift resistor 5010 sequentially as illustrated in the timing chart of FIG. 6. When the transistor 5100 is ON, the analog signal goes through the transistor 5110 and charges up the gate of transistor 5120 in proportion to the above analog signal. The voltage at the node A increases in proportion to the input analog signal from the analog signal driver 5150. Since a capacitance of the gate of the transistor 5120 can be set to be smaller than that of the capacitance 5090, even if the capacitance element 5090 is too large to write the signal under the X-Y matrix based circuit, it is easy to write the analog signal to the high capacitance element 5090. In short, information from the analog signal driver 5150 is written in the high capacitance indirectly through the transistor 5120. After the writing operation, the transistor 5100 will be turned off. The signal can be written to each pixel one by one.

Figure 7:
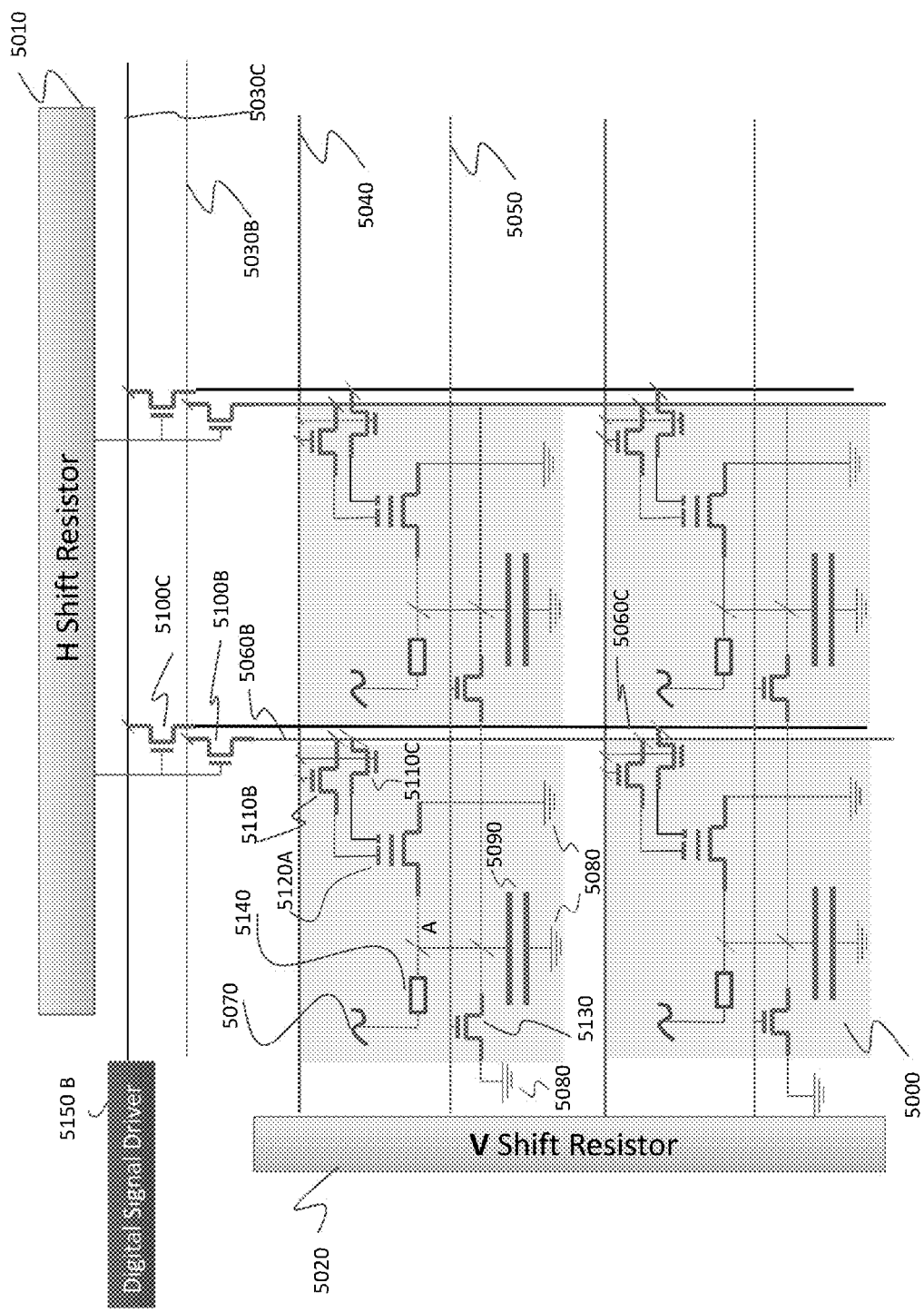
FIG. 7 illustrates a driving circuit.

As a second embodiment, an equivalent circuit for a digital input system is illustrated in FIG. 7 and described below.

A horizontal shift resistor (H Shift Resistor) 5010 selects a column to be written by a digital signal. A vertical shift resistor (V Shift Resistor) 5020 selects a row to be written by the signal. In this embodiment, a multi-gate capacitive coupling MOSFET (metal-oxide-semiconductor field-effect transistor) transistor 5120A for a source follower amplifier is used.

A vertical line 5030B is for writing a digital signal of the $2^{nd}$ bit. A vertical line 5030C is for writing a digital signal of the $1^{st}$ bit. A horizontal gate line 5040 is connected with a transistor 5110B for a $2^{nd}$ bit selection and a transistor 5110C for $1^{st}$ bit selection.

A horizontal gate line 5050 is connected with the reset transistor 5130 for each pixel 5000. A vertical line 5060B is used for the $2^{nd}$ bit digital input signal. A vertical line 5060C is used for the $1^{st}$ bit digital input signal. A voltage source 5070 and an earth 5080 for the grounding are used. Each pixel 5000 has a capacitance element 5090.

A transistor 5100B is used for selecting the vertical line for the $2^{nd}$ bit of digital input signal through the line 5030B. A transistor 5100C is used for selecting the vertical line for the $1^{st}$ bit of the digital input signal through the line 5030C. A transistor 5110B is used for selecting the row for the $2^{nd}$ bit of the digital input signal. A transistor 5110C is for selecting the row for the $1^{st}$ bit of the digital input signal. A multi-gate capacitive coupling MOSFET transistor 5120A is used for the source follower amplifier. A transistor 5130 to reset the voltage of the capacitance element 5090 is used. A resistance 5140 is for the source follower amplifier. A digital signal is sent by a digital signal driver 5150B.

Another driving method for treating the high capacitance element is described below.

Step 1: Reset Operation

Before writing the signal to each capacitance element 5090 per pixel, the voltage of the capacitance element 5090 in the row selected by the vertical shift resistor 5020 will be reset. The reset operation can be executed for each row, or executed by all or a plurality of the rows at the same time. When the line 5050 is high by the vertical shift resistor 5020, the transistor 5130 as the reset transistor becomes ON, and the voltage of the node A becomes 0V.

Step 2: Writing Operation

After the line 5050 is low by the vertical shift resistor 5020, the line 5040 becomes ON by the vertical shift resistor 5020 to select the writing row). And then, the column is selected by the horizontal shift resistor 5010 sequentially. When the transistor 5100B and 5100C are ON, the digital signal goes through the transistor 5110B and 5110C respectively and charges up the gate of transistor 5120A in proportion to the above digital signal. The voltage at the node of A increases in proportional to the input digital signal. Since the gate capacitance of the transistor 5120A is smaller than that of the capacitance element 5090, even if the capacitance element 5090 is too large to write the signal under the X-Y matrix based circuit, it is easy to write the analog signal in the high capacitance element 5090. After the writing operation, the transistor 5100B and 5100C will be turned off. The signal can be written to each pixel one by one.

In the second embodiment, the multi-gate capacitive coupling transistor 5120A has two gates for the $1^{st}$ and $2^{nd}$ bit signals, but the number of gates can be increased.

Figure 8:
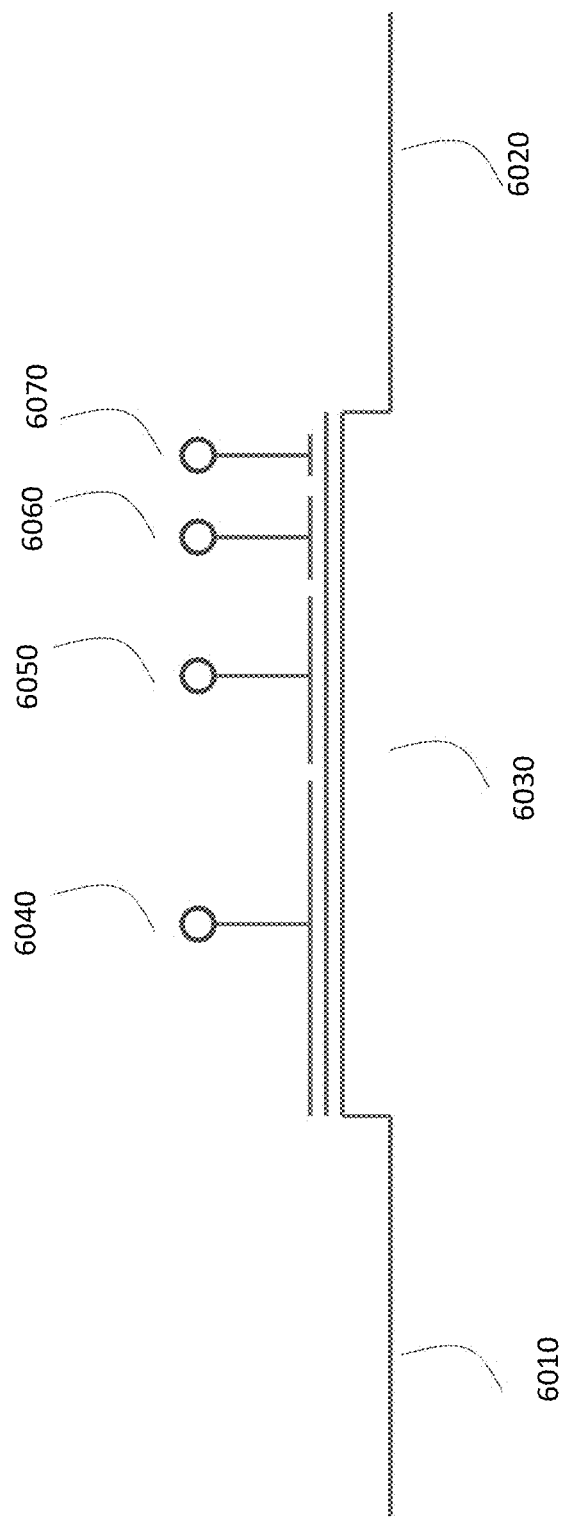
FIG. 8 illustrates a multi-gate capacitive coupling MOSFET.

In FIG. 8, the schematic structure of the Multi-Gate Capacitive coupling MOSFET for 4 bits is explained as an example. A source, drain, and channel are denoted as 6010, 6020, and 6030, respectively. The difference from a conventional MOSFET is to implement the multi-gate through the capacitive coupling to the gate.

The $4^{th}$ bit, $3^{rd}$ bit, $2^{nd}$ bit, and $1^{st}$ bit are corresponding to the gates 6040, 6050, 6060, and 6070, respectively. The area of the $2^{nd}$ bit gate 6060 is twice than that of the $1^{st}$ bit gate 6070. The area of the $3^{rd}$ bit gate 6050 is twice than that of the $2^{nd}$ bit gate 6060. The area of the $4^{th}$ bit gate 6040 is twice than that of the $3^{rd}$ bit gate 6050.

A potential applied to the channel 6030 can be controlled by the combination of each pulse of multi-gate. In order to induce the maximum voltage to the channel, the pulse of 6040, 6050, 6060, and 6070 should be high. In order to induce the half of the maximum voltage to the channel, the pulse of 6040, 6050, 6060, and 6070 should be high, low, low, and low, respectively. In order to induce 75% of the maximum voltage to the channel, the pulse of 6040, 6050, 6060, and 6070 should be high, high, low, and low, respectively. This means that the digital input data can be converted to analog input data by the capacitive coupling in the gate of the above transistor that plays a role of the source follow amplifier.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. A light modulator comprising:
   a band-pass filter configured to select a wavelength of an incident light;
   a first layer;
   a second layer configured to include a trench with a bottom surface, a side surface, and a top surface;
   a thin metal film provided on the side surface of the trench of the second layer; and
   a dielectric layer provided between the first and second layers at the bottom and the top surfaces of the trench, an electric field being applied to the dielectric layer by using the first and second layers,
   wherein the dielectric layer is provided between the thin metal film and the first layer at the side surface of the second layer so that the thin metal film has an anisotropic permittivity due to the electric field.

2. The light modulator according to claim 1, wherein the incident light is polarized light.

3. The light modulator according to claim 1, wherein the thin metal film comprises one of Au and Ag.

4. The light modulator according to claim 1, wherein a thickness of the thin metal film is less than 50 nm.

5. The light modulator according to claim 1, wherein a thickness of the thin metal film is about 10 nm.

6. The light modulator according to claim 1, wherein a thickness of the dielectric layer at the top surface of the trench is different from a thickness of the dielectric layer at the side surface of the trench so that a localized electric field is applied to the thin metal film.

7. The light modulator according to claim 1, further comprising a driving circuit for driving the light modulator.

8. The light modulator according to claim 7, wherein the driving circuit drives a matrix of pixels and each pixel has at least one of the metal film.

9. The light modulator according to claim 7, wherein the driving circuit comprises:

a first selecting unit configured to select a row of the matrix of pixels, each pixel having a capacitance element for modulating light;

a first transistor configured to reset voltage of the capacitance element in the selected row;

a second selecting unit configured to select a column of the matrix of pixels, information being written in the capacitance element specified by the first and second selecting unit; and a second transistor, the information being written in the capacitance element through the second transistor.

10. The light modulator according to claim 9, further comprising a voltage source and a resistance connected with the voltage source, wherein the resistance is connected with the second transistor to form a source follower amplifier.

11. The light modulator according to claim 10, wherein the information is written in a gate of the second transistor so that the information is written in the capacitance element indirectly by using the source follower amplifier.

\* \* \* \* \*